Oct. 20, 1970     E. W. BEAL ET AL     3,535,504

HIGH INTENSITY RUNWAY INSET LIGHT WITH SHALLOW OPTICAL SYSTEM

Filed March 6, 1968     4 Sheets-Sheet 2

United States Patent Office 3,535,504
Patented Oct. 20, 1970

3,535,504
HIGH INTENSITY RUNWAY INSET LIGHT WITH SHALLOW OPTICAL SYSTEM
Edward W. Beal, Wethersfield, Conn. 06109, and William C. Daley, Suffield, Conn. 06078
Filed Mar. 6, 1968, Ser. No. 710,821
Int. Cl. B64f 1/18
U.S. Cl. 240—1.2                                    12 Claims

ABSTRACT OF THE DISCLOSURE

A high intensity inset runway light having an upwardly sloped light transmission ramp with an upstanding radial rib for protecting a weather-sealed exit prism of the light against vehicular damage wherein the shallow optical system subassembly for the lamp is pre-assembled on a support plate or housing and comprises a high intensity filament type lamp, a refracting lens, and the exit prism centered on an upwardly directed axis located in the same vertical plane as the upstanding rib. The refracting lens and the exit prism are also constructed and shaped to focus the light and cause the greater part of useful light to exit from the upper portion of the exit prism above the upstanding rig and any water or other matter collected in the ramp under adverse conditions. The lens also diverges the entering light rays adjacent the optical axis to bypass the upstanding rib and further increase the optical efficiency. The exit prism is tapered and form-fitted in a machined port in the housing of the subassembly encased in a resilient precured covering which assures a positive spacing within the port for shock protection and automatic alignment with the optical axis. The optical components are removably mounted by precision fabricated locater slots and abutments and dual purpose mounting springs for ready replacement of the components without the need for optical testing.

---

This invention relates generally to an airport runway and approach light and particularly to the inset-type high intensity light in which the light source is disposed below the runway surface and light refracting elements therewith associated form an optical system to elevate and cause the emitted light to hug the runway.

Increasing use of airport facilities, especially during increment weather conditions, by aircraft having high speed take-off and landing characteristics, has created urgent need for an easily maintained runway light, most of which is inset below the runway surface and so avoids presenting a hazard to aircraft and snowplow equipment using the runway. Such a light must withstand the impact shock and weight of aircraft rolling over it and the mechanical shock of snowplow equipment striking it; be dependable in all climatic conditions; deliver maximum useful light close to the runway, especially during bad weather conditions; and withstand severe thermal stress generated during operation.

Runway lights which satisfy some of these requirements are known. Despite considerable effort in this art, however, a light unit combining weather sealing; mechanical and thermal durability; acceptable delivery of light especially under increment weather conditions; and economical maintenance, until now has been unavailable.

The present invention fulfills the aforementioned needs by featuring a runway inset light with a novel shallow optical system having plural refracting members for each light beam, and a novel arrangement for the precision mounting of interchangeable system elements.

An object of this invention is to provide a new and improved high intensity runway inset light.

Another object of this invention is to provide a high intensity sealed runway inset light featuring an optical system so mounted therein that it withstands severe operation-generated thermal stresses and mechanical stresses incurred through vehicular impact and weight, and having readily replaced self-aligning elements.

Another object of this invention is to provide a high intensity runway inset light wherein each light beam is directed through a plurality of refracting elements disposed successively radially outwardly of the light source.

Another object of this invention is to provide an inset light of the type described having shallow light means adapted to deliver increased useful light close to a runway with minimum degradation by water or other matter that may collect on the runway. Included in this object is the provision of an optical system giving increased light under increment weather conditions.

In the drawings:

FIG. 3 is an enlarged elevation view of the light fixture of FIG. 1, in section, partly fragmented, along the line 3—3 of FIG. 2;

Figure 1:
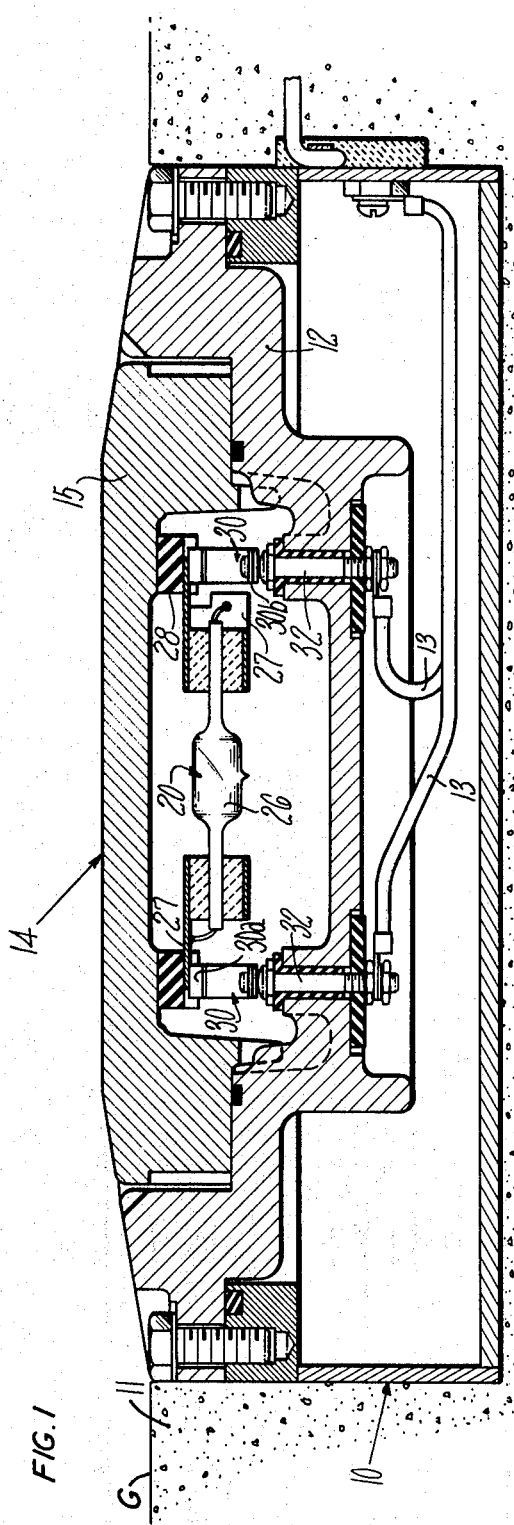
FIG. 1 is an elevation view of an inset light fixture in section, embodying the invention.

Referring now to the drawings in greater detail, wherein like reference numerals indicate like parts throughout the several figures, FIG. 1 shows an illustrative embodiment of the invention having a waterproof receptacle 10 embedded below the surface G of a runway 11 in a typical installation. As shown, a base ring 12 is sealed and removably bolted to the receptacle 10 and overlies power leads 13 suitably associated with some external electrical source. An optical assembly 14 is shown as being mounted by a support plate or housing 15 which is sealed and removably bolted to the base ring 12 to index and point the emitted light beams along the desired path as, for example, along the center line of a runway.

Although the drawing illustrates an optical assembly 14 wherein the light is directed in two opposite directions, the following description, for simplicity of discussion, is set forth in terms of the components for directing light in one direction only, it being understood that the optical components for directing light in the opposite direction are identical in construction and location relative to each other.

The housing 15 includes an appropriate light beam transmitting radial trough or ramp 16 aligned with upwardly sloping trough extensions 16a of the base ring 12 which extend to the periphery of the complete light fixture. As installed, the light fixture protrudes above the runway surface G a maximum of one-half inch. The base ring 12 and the housing 15 are suitably heavy castings for sustaining aircraft rolling over them and also for protecting the optical assembly elements from these and other mechanical stresses such as are imparted by close-by operation of snow removal equipment. The base ring 12 and housing 15 also serve to dissipate the intense heat generated during lamp operation, which with a 200 watt lamp may generate an ambient temperature of 300° F. or higher within the optical compartment of the housing 15.

An upstanding rib 18 is shown as being provided in each trough extension 16a of the base ring 12, for protecting an exit prism 74 from damage by overriding aircraft skids or other equipment such as snowplows.

Figure 2:
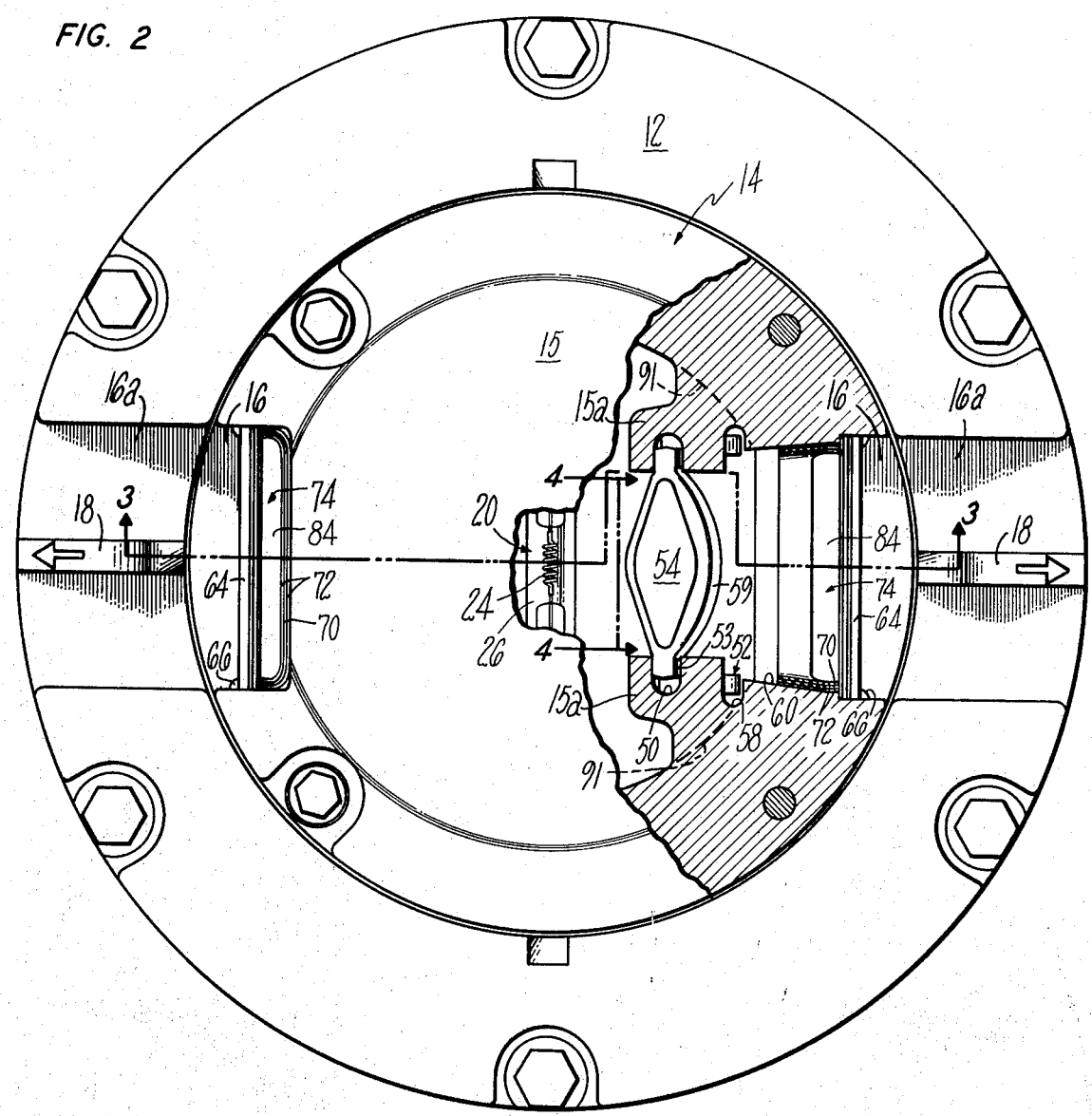
FIG. 2 is a somewhat reduced plan view, partly broken away, of the light fixture of FIG. 1.

In accordance with an aspect of this invention, the optical assembly is constructed and arranged for the replacement of interchangeable parts without optical testing and adjustment. In carrying out this aspect of the invention, the lamp 20 having a filament 24 disposed in a quartz envelope 26 is shown in FIGS. 1–3 as being fixed in metal holders 27 so that the filament is prealigned relatively to the holders in the vertical, horizontal and axial planes, as is more fully disclosed in copending patent application Ser. No. 656,456 filed July 27, 1967 for "Inset High Intensity Light and Cooling Means Therefor."

Figure 3A:
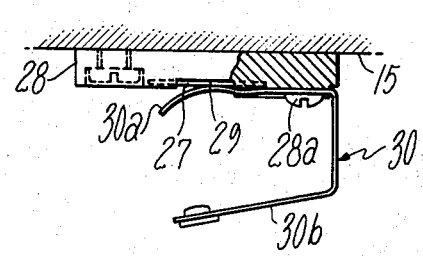
FIG. 3a is a fragmentary view of the arrangement for removably mounting the lamp in the fixture.
Figure 5:
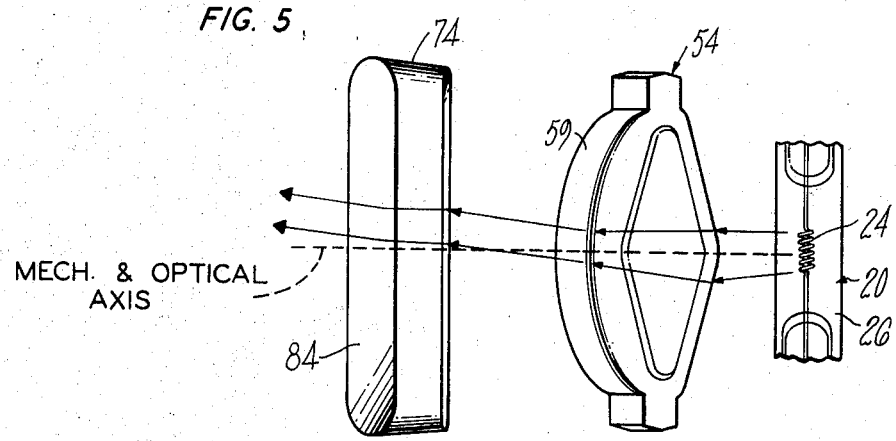
FIG. 5 is a schematic plan view of part of the light fixture of FIG. 1, showing certain illustrative light ray paths and optical features.

To mount the lamp 20, the housing 15 is provided with insulating type mounting blocks 28 having locater grooves 29 which closely receive lamp holders or terminals 27 to precisely locate the same. U-shaped spring contact assemblies 30, fixed to the blocks 28 as by screws 28a through one leg 30a adjacent the bottom of the U so that the free end of leg 30a overlies the groove 29, removably bias the end of holder 27 therein (FIG. 3a). The other leg 30b is biased against a terminal 32 of the base ring 12. With this construction, interchangeable replacement lamps 20 may be quickly and precisely installed on the optical axis without optical testing or adjustment.

The housing 15 is also provided with precision located retainer grooves 50 to receive and position the ends of a refractor, or a lens-prism 54 at an inclination of approximately 10° from horizontal as shown in FIG. 3 with the filament centered on the optical axis of the refractor 54. The lens-prism is removably retained in the grooves 50 by spring clamp and screw assemblies 52 and is biased against a wall of each of grooves 50 by a leaf spring 53 thereby facilitating ready replaceability and precision-alignment of the lens-prism 54 without the need to optically test the installation for proper alignment. Filter grooves 58 are also provided in the housing 15 in positions disposed outwardly, tandem-like, of the lens-prism retainer grooves 50 to receive and retain color filters if desired, for providing colored light beams. An end of the spring clamps 52 overlies filter grooves 58 to removably bias such filters in place in the grooves 58.

A machined opening 60 is provided in the side of the housing 15 to receive the exit prism 74. The opening is shown (FIG. 2) as being generally rectangular in shape with rounded ends with a taper which converges toward the lamp 20 to automatically self-center and precisely locate the prism 74 during installation of the same. In the assembly of the prism 74, a silicone rubber covering 70 is laminated over the tapered peripheral walls thereof by a silicone rubber adhesive 72. Additional liquid adhesive is then layered upon the covering 70, and the prism is installed in the opening 60 of the housing 15 from the outside thereof. A retainer bar 64 secured by screws 66 applies a bias against the exit side of prism 74 to compress the covering 70 and retain the prism in the tapered opening 60, with the precured resilient covering 70 providing a void-free positive spacer preventing contact between the housing 15 and the prism 74 and the transmission of concentrated non-uniform stresses therebetween. This arrangement also accommodates usual manufacturing tolerances in the manufacture of the prism 74 and the opening 60 while maintaining the desired alignment of the prism therein.

Another important aspect of this invention resides in its unique optical system. The mechanical design of the light fixture locates the divergent light producing filament 24 having a finite length of about ⅜" and diameter of about ⅛", approximately 1" below the top surface of housing 15. With the normal ½" protrusion of the fixture above the runway surface, the filament 24 is located about ½" below the surface G of the runway, and approximately the bottom half of the exit prism 74 is below ground level.

Under the applicable technical requirements for runway lights, the useful light includes the high intensity core of light which may extend upwardly as much as 4° above the runway and the low intensity light which may extend upwardly to 6° above the runway. It is especially important that the maximum useful light be available under inclement weather and other adverse conditions.

In order to provide maximum useful light hugging the runway and in order to minimize the degradation of the light especially under inclement weather conditions, the optical system of this invention is desgned so that the greater portion of the light exits from the top half of the exit face 84 of exit prism 74 and at least two-thirds or more of the useful light is above any water or other matter that may collect in the trough 16 and passes above the rib 18 to minimize the photometric losses due to the blocking of light by the rib 18.

Figure 6:
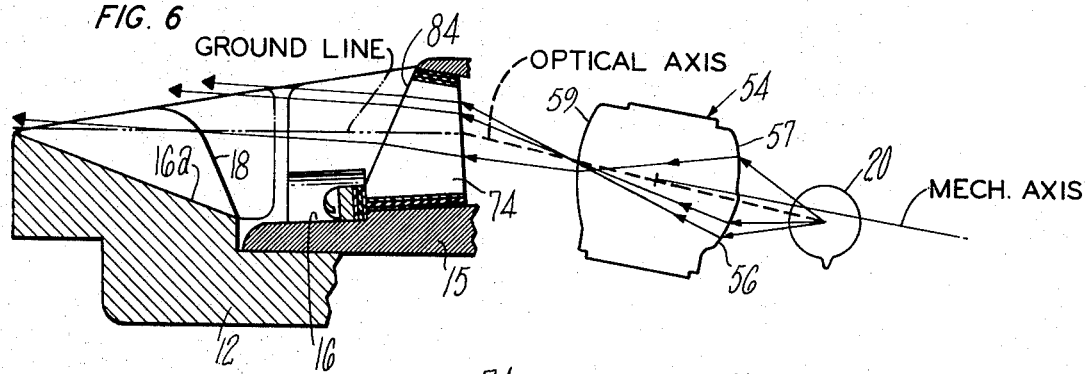
FIG. 6 is a schematic elevation view, oriented as in FIG. 3, of part of the light unit of FIG. 1, showing certain illustrative light ray paths and optical features.
Figure 7:
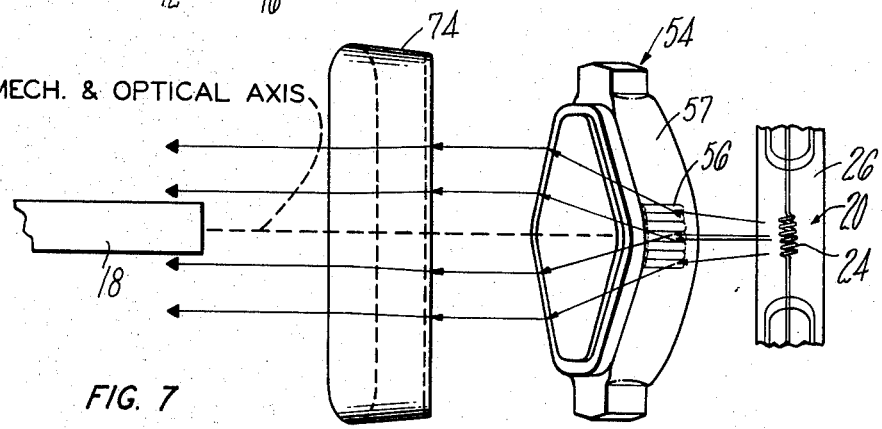
FIG. 7 is a schematic plan view, similar to FIG. 5 but inverted therefrom, showing certain illustrative light ray paths and optical features.

In the optical system of this invention, the mechanical axis may be described as a line drawn at right angles to the plane of the walls of grooves 50 at the midpoint between the grooves 50 and through the vertical center of the lens-prism 54. Such an axis is disposed at an angle of about 10° relative to the horizontal. The filament 24 is centered on the mechanical axis but is disposed on the optical axis of lens-prism 54 which lies in the same vertical plane as the mechanical axis but about 4° below the mechanical axis. The lens-prism 54 has a focal length of approximately 1" in a vertical plane through the optical axis. The light entrance face 57 and the light exit face 59 of refractor 54 are each shown as being generally convexly curved in both the horizontal and vertical directions with the curvature thereof being symmetrical on each side of a vertical plane through the optical axis. However, in order to achieve the results of this invention, the entrance face 57 of refractor 54 is nonsymmetrical above and below a generally horizontally plane through the mechanical axis thereof. The lower portion of the entrance face 57 thereof recedes more sharply from its point of closest approach to the filament 24 so that the upper edge of refractor 54 is thicker in the light transmitting direction than is its lower edge. In the illustrated embodiment, this is accomplished by providing a generally greater curvature on the lower portion of entrance face 57 (see FIG. 6) so that the lower portion of the entrance face provides about 57% of the total area of the entrance face. Also as shown in FIG. 2, the central portion of the entrance face 57 is more sharply curved than the side portions while the exit face 59 is of generally uniform curvature from side to side.

By virtue of this construction, the light passing through the bottom half of the entrance face 57 is refracted upwardly to increase the proportion of the light exiting through the upper portion of the exit prims 74 where it is not subject to degradation by water or other matter collected in the trough 16.

Figure 4:
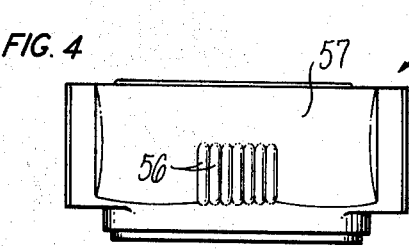
FIG. 4 is an elevation view, in section, taken along the line 4—4 of FIG. 2.

The entrance face 57 of lens 54 is further provided with a plurality of closely spaced vertical ribs 56 (shown in FIG. 4 as being seven in number) which extend upwardly from the bottom edge to about 60% of the total height of the entrance face 57 and laterally about one-third of the width of the entrance face 57 centered on the axis thereof. These ribs serve to diverge the light rays horizontally to utilize a greater cross-sectional area of the lens than if they did not exist. In addition, because of the location of the ribs adjacent the optical center of the lens, the highest concentration of light rays from the filament 24 impinges upon the vertical ribs 56, and by causing the light rays to diverge horizontally, these ribs minimize the photometrc losses which would otherwise occur by causing a large percentage of this high intensity core of light which would otherwise be blocked by the rib 18 to be laterally offset so as to pass along the sides of the rib 18.

The exit prism 74 shown defines, in side section, a generally trapezoidal shape whose light entrance and exit faces 76 and 84, respectively, converge upwardly toward each other, but at different angles, with the angle to vertical of the entrance face being disposed at about 3½° beyond the vertical as measured from the entrance side of the prism 74 and the exit face 84 being about 21° from the vertical and optical axis of the beam emerging from the exit face 84 at about 3° above ground plane, despite the much steeper mechanical axis of the optical system and the steeper angle of the exit ramp or trough extension 16a.

Figure 8:
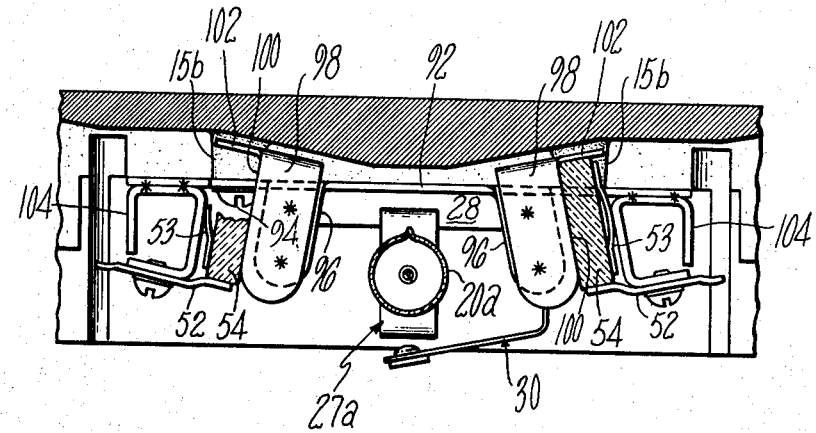
FIG. 8 is a fragmentary view similar to FIG. 3 showing a modified form of the invention.
Figure 9:
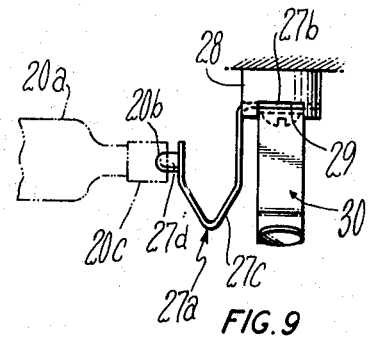
FIG. 9 is a fragmentary elevational view of the lamp holder of FIG. 8.

FIGS. 8 and 9 illustrate another form of the invention wherein the supports for precisely locating and aligning the refractor 54 are fabricated from stamped sheet metal parts.

In this form of the invention, the machined grooves 50 and 58 and the upstanding portion 15a radially within the dotted line 91 (FIG. 2) are eliminated. As shown in FIG. 8, a flat stamped plate 92 rests on the ends of a pair of bosses 15b projecting downwardly from the top portion of the housing 15 and secured thereto by any suitable means, such as a pair of screws 94 (only one of which is shown for simplicity of illustration). The stamped plate 92 spans the pair of bosses 15b and serves as a base for the support.

The stamped plate 92 is provided with a pair of ears 96 which are bent downwardly in a plane substantially perpendicular to the stamped plate 92. The ears 96 are positioned so as to provide an edge in the approximate position to locate the refractors 54. As shown in FIG. 8, a pair of generally L-shaped metal clips 98 are respectively secured, as by spot welding, to the ears and are located relative to the bosses 15b and the mounting screws 94 to provide edge abutments 100 precisely positioned to locate the refractor in the desired transverse location (as viewed in FIG. 8). Each L-shaped metal clip 98 further provides a laterally extending foot 102 which serves to fix the vertical position of the refractor 54.

The supports for refractor 54 also include a pair of fabricated sheet metal posts 104 for mounting the spring clip and screw assemblies 52. As shown, posts 104 are spot welded to the plate 92. The sheet metal posts 104 further serve to suport the leaf springs 53 so as to bias the end of the refractor 54 against abutments 100.

A color filter may be inserted between the fabricated sheet metal post 104 and the wall of the housing 15 to provide the equivalent of the machined groove 58 of the first embodiment.

While FIG. 8 illustrates only one fabricated support for supporting one end of the refractors 54, it will be readily apparent that a similar support may be provided for supporting the opposite ends thereof.

The embodiment of FIGS. 8 and 9 also illustrates a dual function support for a different type of quartz lamp 20a having recessed terminals in coaxial recesses 20b in each ceramic end cap 20c. The support and terminal clip 27a is provided with a flat base portion 27b which is closely received within the locater grooves 29 of the mounting block 28. A U-shaped laterally extending portion 27c is fixed to the base portion 27b and terminates in an electrical contact 27d received within the recess 20b of the lamp 20a support the lamp and to provide an electrical connection therewith. As shown in FIGS. 8 and 9, the spring contact assembly 30 is utilized to automatically complete the electrical circuit through the lamps 20a upon the assembly of the housing 15 on the base ring 12 to provide interchangeability with the first embodiment. It should be noted, however, that the contact assemblies 30 may be replaced with any suitable electrical conductor since they are not required for the positioning and locating of lamp 20a in the embodiment of FIGS. 8 and 9.

The invention thus provides a high intensity runway light adapted for inset installation, which light is readily maintained with replaceable, automatically aligning interchangeable optical components which are installed to resist severe mechanical and thermal stresses and at the same time function dependably to deliver the greater part of the emitted useful light close to the runway and in a manner minimizing degradation by water and other matter that may have collected on the runway or in the light trough, with minimum photometric losses.

As will be apparent to persons skilled in the art, various modifications and adaptations of the structure above-described will become readily apparent without departure from the spirit and scope of the invention, the scope of which is defined in the appended claims.

We claim:

1. A shallow optical system for a substantially inset runway light fixture comprising a light source providing a divergent light beam, a light refractor having an optical axis angled upwardly from the light source and passing through the center of said light source, said light refractor having an entrance face collecting rays of light from the source, a light exit port in the fixture, and an upwardly sloping trough positioned radially outwardly of the light exit port externally of the fixture to transmit the light from the exit port, said entrance face of said light refractor being nonplanar with the lower portion thereof receding more sharply from a generally horizontal plane through the optical axis than the upper portion thereof to direct the major portion of the collected light rays through the upper portion of the exit port to minimize degradation of the transmitted light by water or other matter collected in the trough.

2. A device as recited in claim 1 wherein the lower half of the entrance face of the refractor is configured to provide more than one-half of the total area of the entrance face.

3. A device as recited in claim 1 wherein the entrance face of the refractor is of generally convex configuration and the lower half thereof has a greater curvature than does the upper portion.

4. A device as recited in claim 3 wherein an upstanding radially directed rib is positioned in the trough substantially centered on the mechanical axis of the light refractor and the lower portion of the entrance face includes a plurality of vertically disposed columnar prisms to laterally diverge the central core of high intensity light rays received from the light source to cause a substantial portion thereof to bypass the upstanding rib.

5. A device as recited in claim 3 wherein an exit prism is mounted in the exit port and bends the light rays downwardly to cause them to hug the runway.

6. A device as recited in claim 5 wherein the optical axis of the light refractor is disposed at an angle of about 14° relative to a horizontal plane and at least two-thirds of the useful light exiting from the fixture passes above any water that may collect in the trough.

7. A device as recited in claim 5 wherein the exit prism and the exit port have complementary tapers and a precured resilient positive spacer is wedged therebetween to seal the same relative to each other and to prevent direct mechanical contact therebetween.

8. A device as recited in claim 7 wherein the complementary tapers diverge in a generally radial outward direction for assembly of the exit prism from the outside of the fixture.

9. A device as recited in claim 1 wherein the fixture has precision machined locater grooves and surfaces for mounting interchangeable optical components in precise alignment to eliminate the need for optical adjustments after replacemet of a component, and resilient means are provided to position and retain each optical component in assembled position and to safeguard the same against mechanical and thermal shocks.

10. A device as recited in claim 9 wherein the optical system is preassembled on a removable support forming the top of the fixture.

11. A device as recited in claim 10 wherein the precision located grooves and surfaces are machined in the removable support.

12. A device as recited in claim 10 wherein the precision located grooves and surfaces for mounting the refractor are provided by a removable fabricated stamping.

References Cited

UNITED STATES PATENTS

| | | | |
|---|---|---|---|
| 3,113,726 | 12/1963 | Pennow et al. | 240—41.3 |
| 3,250,906 | 5/1966 | Loch | 240—41.3 |
| 3,250,907 | 5/1966 | Keck et al. | 240—41.3 |
| 3,327,104 | 6/1967 | Loch | 240—1.2 |
| 3,369,112 | 2/1968 | Loch | 240—1.2 |

NORTON ANSHER, Primary Examiner

M. D. HARRIS, Assistant Examiner

U.S. Cl. X.R.

240—41.3, 106